US009778468B2

(12) United States Patent
Yang et al.

(10) Patent No.: US 9,778,468 B2
(45) Date of Patent: Oct. 3, 2017

(54) HEAD-MOUNTED DISPLAY AND DIOPTER ADJUSTMENT METHOD THEREOF

(71) Applicant: Beijing Pico Technology Co., Ltd., HaiDian District (CN)

(72) Inventors: Yun long Yang, HaiDian District (CN); Hui jun Zhang, HaiDian District (CN)

(73) Assignee: Beijing Pico Technology Co., Ltd., HaiDian District (CN)

( * ) Notice: Subject to any disclaimer, the term of this patent is extended or adjusted under 35 U.S.C. 154(b) by 0 days.

(21) Appl. No.: 15/151,047

(22) Filed: May 10, 2016

(65) Prior Publication Data
US 2016/0334627 A1    Nov. 17, 2016

(30) Foreign Application Priority Data

May 12, 2015    (CN) .......................... 2015 1 0239634

(51) Int. Cl.
*G02B 27/01*    (2006.01)

(52) U.S. Cl.
CPC ......... *G02B 27/0176* (2013.01); *G02B 27/01* (2013.01); *G02B 27/017* (2013.01); *G02B 27/0172* (2013.01); *G02B 2027/0127* (2013.01)

(58) Field of Classification Search
CPC .. G02B 27/01; G02B 27/017; G02B 27/0172; G02B 27/0176
USPC ....................... 359/630; 351/225, 233; 2/426
See application file for complete search history.

(56) References Cited

U.S. PATENT DOCUMENTS

| 3,029,696 | A | * | 4/1962 | Schmidt | ................. | G02C 3/003 |
| | | | | | | 359/411 |
| 3,458,246 | A | * | 7/1969 | Krebs | .................... | G02B 7/002 |
| | | | | | | 359/481 |
| 6,065,835 | A | * | 5/2000 | Pekar | ....................... | G02C 7/14 |
| | | | | | | 351/158 |

(Continued)

FOREIGN PATENT DOCUMENTS

| CN | 203981982 U | 12/2014 |
| CN | 104570355 A | 4/2015 |
| CN | 204705768 U | 10/2015 |

OTHER PUBLICATIONS

State Intellectual Property Office of the People's Republic of China, Office Action in Chinese Patent Application No. 201510239634.7 mailed Sep. 27, 2016.

*Primary Examiner* — William R Alexander
(74) *Attorney, Agent, or Firm* — LKGlobal | Lorenz & Kopf, LLP

(57) ABSTRACT

A head-mounted display includes a control knob, a transmission component and a rotatable drive shaft. The control knob is mounted on the body frame. The transmission component comprises a transverse transmission part mounted on a horizontal border of the body frame and a vertical transmission part mounted on a vertical border of the body frame. One end of the transverse transmission part is meshed with one end of the vertical transmission part, and the control knob is connected to a middle portion of the transverse transmission part. The drive shaft has one end fixed on the body frame, the other end as a screw rod, and a middle portion meshed with the other end of the vertical transmission part. the display module frame is provided with a nut fitted with the screw rod of the drive shaft, and the screw rod passes through the display module frame via the nut.

10 Claims, 4 Drawing Sheets

(56) References Cited

U.S. PATENT DOCUMENTS

| | | | | |
|---|---|---|---|---|
| 6,067,192 | A * | 5/2000 | Lichtenfield | G02B 7/12 348/E13.022 |
| 6,538,624 | B1 * | 3/2003 | Karasawa | G09B 9/307 345/8 |
| 6,877,856 | B1 * | 4/2005 | Hasegawa | G02C 7/16 351/158 |
| 9,176,325 | B2 * | 11/2015 | Lyons | G02B 27/0172 |
| 2003/0063906 | A1 * | 4/2003 | Abe | G03B 13/00 396/144 |
| 2004/0032568 | A1 * | 2/2004 | Fukuma | A61B 3/0285 351/233 |
| 2007/0171524 | A1 | 7/2007 | Steinthal et al. | |
| 2008/0239499 | A1 * | 10/2008 | Fukuda | G02B 3/0006 359/619 |
| 2013/0141692 | A1 * | 6/2013 | Crosby | G02C 5/10 351/159.48 |
| 2014/0176909 | A1 * | 6/2014 | Spivey | A61B 3/04 351/223 |
| 2015/0198811 | A1 * | 7/2015 | Hoellwarth | G02B 27/017 345/8 |
| 2015/0253574 | A1 * | 9/2015 | Thurber | G02B 27/0172 359/630 |
| 2016/0011424 | A1 * | 1/2016 | Thurber | G02B 27/64 345/8 |
| 2016/0116748 | A1 * | 4/2016 | Carollo | H04N 13/0285 345/8 |
| 2016/0156850 | A1 * | 6/2016 | Werblin | G06F 3/013 348/63 |
| 2017/0010471 | A1 * | 1/2017 | Serrano Canovas | G02B 27/0176 |
| 2017/0102546 | A1 * | 4/2017 | Tempel | G02B 27/0176 |
| 2017/0127933 | A1 * | 5/2017 | Widman | A61B 3/0285 |

* cited by examiner

HEAD-MOUNTED DISPLAY AND DIOPTER ADJUSTMENT METHOD THEREOF

CROSS-REFERENCE TO RELATED APPLICATIONS

This application claims priority to Chinese Application Number 201510239634.7 filed May 12, 2015, which is incorporated herein by reference in its entirety.

TECHNICAL FIELD

The present invention relates to the technical field of intelligent terminals, and particularly, to a head-mounted display and a diopter adjustment method thereof.

BACKGROUND

Currently in the market, the head-mounted display is designed not so elaborate and has a complex structure and a large volume. In addition, the use requirement of myopes is usually not considered in the head-mounted display. Even if some head-mounted displays realize a diopter adjustment, the diopter adjusting structure is very complex and the cost is extremely high.

SUMMARY

The present invention provides a head-mounted display and a diopter adjustment method thereof, so as to solve the problem that the existed head-mounted display has a complex diopter adjusting structure.

In order to achieve the above object, the technical solutions of the present invention are implemented as follows:

In one aspect, the present invention provides a head-mounted display, comprising a body frame configured to support an optical module of the head-mounted display, and a display module frame configured to support a display module of the head-mounted display, the display module frame being located at a front end of the body frame, wherein the head-mounted display comprises a control knob, a transmission component and a rotatable drive shaft, the control knob is mounted on the body frame;

the transmission component comprises a transverse transmission part mounted on a horizontal border of the body frame and a vertical transmission part mounted on a vertical border of the body frame; one end of the transverse transmission part is meshed with one end of the vertical transmission part, and the control knob is connected to a middle portion of the transverse transmission part;

the drive shaft has one end fixed on the body frame, the other end as a screw rod, and a middle portion meshed with the other end of the vertical transmission part; the display module frame is provided with a nut fitted with the screw rod of the drive shaft, and the screw rod passes through the display module frame via the nut;

when the control knob rotates, it causes the drive shaft to rotate through the transmission component, so that the display module frame is movable forward and rearward relative to the body frame, thereby realizing a diopter adjustment of the head-mounted display.

Preferably, the drive shaft comprises a fixing portion and a rotation portion;

the fixing portion is fixedly mounted on the body frame;

one end of the rotation portion facing the display module frame is a screw rod, the other end of the rotation portion is sleeve-connected to the fixing portion, and a bevel gear linked with the screw rod is provided at a position where the rotation portion is sleeve-connected to the fixing portion.

Further preferably, the control knob has a bevel gear; the transverse transmission part comprises a left-side transverse transmission part and a right-side transverse transmission part symmetrically provided on horizontal border at two sides of the control knob; and the vertical transmission part comprises a left-side vertical transmission part and a right-side vertical transmission part symmetrically provided on vertical borders at two sides;

the transverse transmission part at each side has two ends mounted with a bevel gear, and the vertical transmission part at each side also has two ends mounted with a bevel gear;

the bevel gear of the control knob is respectively meshed with a bevel gear at one end of the transverse transmission part at each side, a bevel gear at the other end of the transverse transmission part at each side is correspondingly meshed with a bevel gear at one end of the vertical transmission part at the same side, and a bevel gear at the other end of the vertical transmission part at that side is correspondingly meshed with a bevel gear of a transmission shaft on the vertical border at the same side of the body frame.

Preferably, the body frame is further provided with an auxiliary support parallel with the display module frame, a mounting hole is provided at a position on the auxiliary support corresponding to the screw rod of the drive shaft on the body frame, and the screw rod of the drive shaft is fitted with the nut of the display module frame after passing through the mounting hole of the auxiliary support;

during a forward and rearward movement of the display module frame caused by the transmission component, the identical-direction rotation of the control knob is locked when the display module frame contacts the auxiliary support.

Further preferably, the display module frame is provided with a limiting hole; a limiting post fitted with the limiting hole has one end fixed to the auxiliary support after passing through the limiting hole, the other end as a head of the limiting post, and a middle portion slidable relative to the limiting hole;

during a forward and rearward movement of the display module frame caused by the transmission component, the identical-direction rotation of the control knob is locked when the head of the limiting post is engaged with the limiting hole.

Further preferably, the limiting holes are provided at four corners of the display module frame, respectively, and each limiting hole is fitted with one of the limiting posts, so that the display module frame is stably slidable forward and rearward relative to the body frame.

Preferably, the transverse transmission part at each side is provided with a first engagement portion protruding from a surface thereof, a first support portion is provided at a position on the horizontal border of the body frame corresponding to the first engagement portion of the transverse transmission part at each side, and the transverse transmission part at each side is mounted on the body frame through the cooperation between the first engagement portion and the first support portion;

the vertical transmission part at each side is provided with a second engagement portion protruding from a surface thereof, a second support portion is provided at a position on the vertical border of the body frame corresponding to the second engagement portion of the vertical transmission part at each side, and the vertical transmission part at each side is mounted on the body frame through the cooperation between the second engagement portion and the second support portion.

Further preferably, the first engagement portions are symmetrically provided at two sides of a middle position of the transverse transmission part at each side in a preset threshold distance to the middle position, and corresponding first support portions are provided on the horizontal border of the body frame, so that the transverse transmission part at each side is stably and fixedly mounted;

the second engagement portions are symmetrically provided at two sides of a middle position of the vertical transmission part at each side in a preset threshold distance to the middle position, and corresponding second support portions are provided on the vertical borders at two sides of the body frame, so that the vertical transmission part at each side is stably and fixedly mounted.

Preferably, a surface of the body frame is further provided with a mounting slot in which a part of the control knob is accommodated and fixedly mounted on the body frame through a mounting shaft in the mounting slot.

In another aspect, the present invention further provides a diopter adjustment method of a head-mounted display that comprises a body frame configured to support an optical module of the head-mounted display, and a display module frame configured to support a display module of the head-mounted display, the display module frame being located at a front end of the body frame, wherein the method comprises:

mounting a control knob, a left-side transverse transmission part and a right-side transverse transmission part which have bevel gears on a horizontal border of the body frame;

mounting a drive shaft, a left-side vertical transmission part or a right-side vertical transmission part on vertical borders at two sides of the body frame, respectively; wherein the drive shaft comprises a fixing portion and a rotation portion; the fixing portion is fixedly mounted on the body frame; one end of the rotation portion facing the display module frame is a screw rod, the other end of the rotation portion is sleeve-connected to the fixing portion, and a bevel gear linked with the screw rod is provided at a position where the rotation portion is sleeve-connected to the fixing portion;

mounting a bevel gear at each end of the left-side transverse transmission part and each end of the right-side transverse transmission part, respectively, and mounting a bevel gear at each end of a left-side vertical transmission part and each end of a right-side vertical transmission part, respectively, so that the bevel gear of the control knob is respectively meshed with a bevel gear at one end of the transverse transmission part at each side, a bevel gear at the other end of the transverse transmission part at each side is correspondingly meshed with a bevel gear at one end of the vertical transmission part at the same side, and a bevel gear at the other end of the vertical transmission part at that side is correspondingly meshed with a bevel gear of a transmission shaft on the vertical border at the same side of the body frame;

providing a nut fitted with the screw rod of the drive shaft on the display module frame, the screw rod passing through the display module frame via the nut;

turning the control knob to cause the drive shafts on the vertical borders at two sides of the body frame to rotate simultaneously through the transverse transmission parts and the vertical transmission parts at two sides, so that the display module frame is movable forward and rearward relative to the body frame, thereby realizing a diopter adjustment of the head-mounted display.

The embodiments of the present invention have the following beneficial effects: through the technical solutions provided by the embodiments of the present invention, rotatable drive shafts are provided on the body frame of the head-mounted display, the body frame is connected to a display module frame of the head-mounted display through the drive shafts, and a transmission component is provided on the body frame and driven with the control knob to cause the drive shaft to rotate, so as to transform a rotational motion of the control knob into a forward and rearward linear motion of the display module frame, so that the display module frame is movable forward and rearward relative to the body frame, thereby realizing a diopter adjustment of the head-mounted display. Those embodiments of the present invention have the characteristics of simple structure, easy implementation, and low cost.

The above descriptions just summarize the technical solutions of the present invention, which can be embodied based on the content of the Description so as to understand the technical means of the present invention more clearly. Furthermore, in order to enable the above and other objects, features and advantages of the present invention to be understood more obviously and easily, the embodiments of the present invention are specifically given as follows.

BRIEF DESCRIPTION OF THE DRAWINGS

The present invention will hereinafter be described in conjunction with the following drawing figures, wherein like numerals denote like elements, and the same part is denoted with the same reference signs throughout the drawings. In which.

Figure 1:
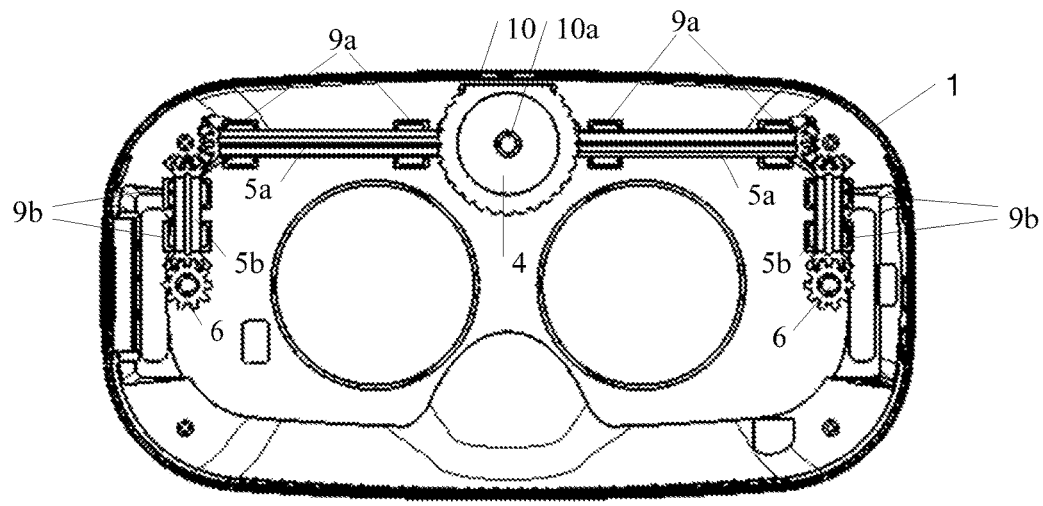
FIG. 1 is a front view of a body frame of a head-mounted display provided by an embodiment of the present invention.

In which, 1. body frame; 2. display module frame; 3. drive adjustment mechanism; 4. control knob; 5*a*. transverse transmission part; 5*a*1. left-side transverse transmission part; 5*a*2. right-side transverse transmission part; 5*b*. vertical transmission part; 5*b*1. left-side vertical transmission part; 5*b*2. right-side vertical transmission part; 6. drive shaft; 6*a*. fixing portion; 6*b*. rotation portion; 6*b*1. screw rod; 7. nut; 8*a*. first engagement portion; 8*b*. second engagement portion; 9a. first support portion; 9b. second support portion; 10. mounting slot; 10a. mounting shaft; 11. auxiliary support; 11a. mounting hole; 12. limiting hole.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The exemplary embodiments of the present disclosure will be described more detailed with reference to the drawings. Although the drawings illustrate the exemplary embodiments of the present disclosure, it shall be appreciated that the present disclosure can be implemented in various ways, rather than being restricted by the embodiments elaborated herein. On the contrary, those embodiments are provided for understanding the present disclosure more thoroughly, and communicating the range of the present disclosure to those skilled in the art completely. In order that the objects, technical solutions and advantages of the present invention are clearer, the embodiments of the present invention will be further described in details with reference to the drawings.

The overall design idea of the present invention is to connect a display module frame with a body frame through rotatable drive shafts provided on the body frame of the head-mounted display, provide a transmission component on the body frame of the head-mounted display, drive the transmission component with the control knob to cause the drive shaft to rotate, so that the display module frame is movable forward and rearward relative to the body frame, thereby realizing the diopter adjustment of the head-mounted display.

The wording "a", "an" used in the context is not restricted to describe a single part, but shall include one or more parts. The wording "one end", "the other end" used in the context is not restricted to a fixed direction, but shall be understood according to specific embodiment.

Firstly, words of locality concerned in the embodiments are briefly described: the left, right, front and rear directions are defined under the normal wearing state of the head-mounted display. The extending directions of the connection line between the centers of the left and right lenses are the left and right directions, and the thickness directions of the head-mounted display are the front and rear directions. The side where the display screen is located is the front end of the head-mounted display, and the side close to the person's face is the rear end of the head-mounted display.

Figure 2:
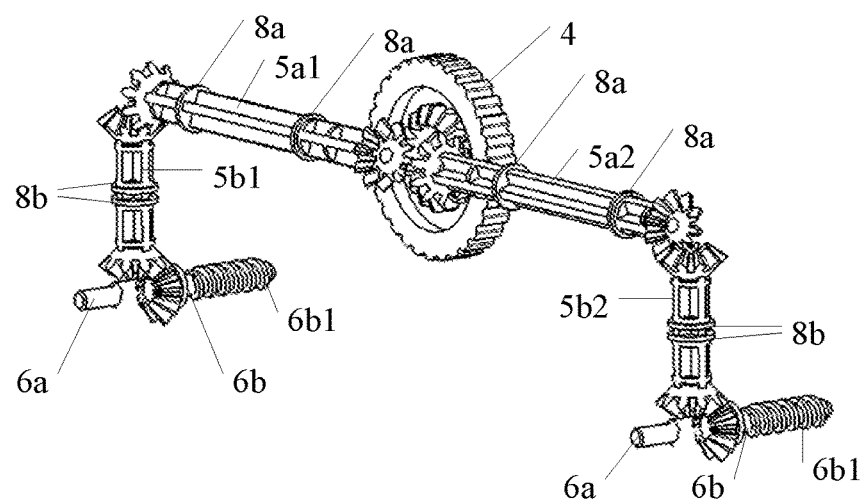
FIG. 2 is a schematic diagram of a drive adjustment mechanism of a head-mounted display provided by an embodiment of the present invention.
Figure 3:
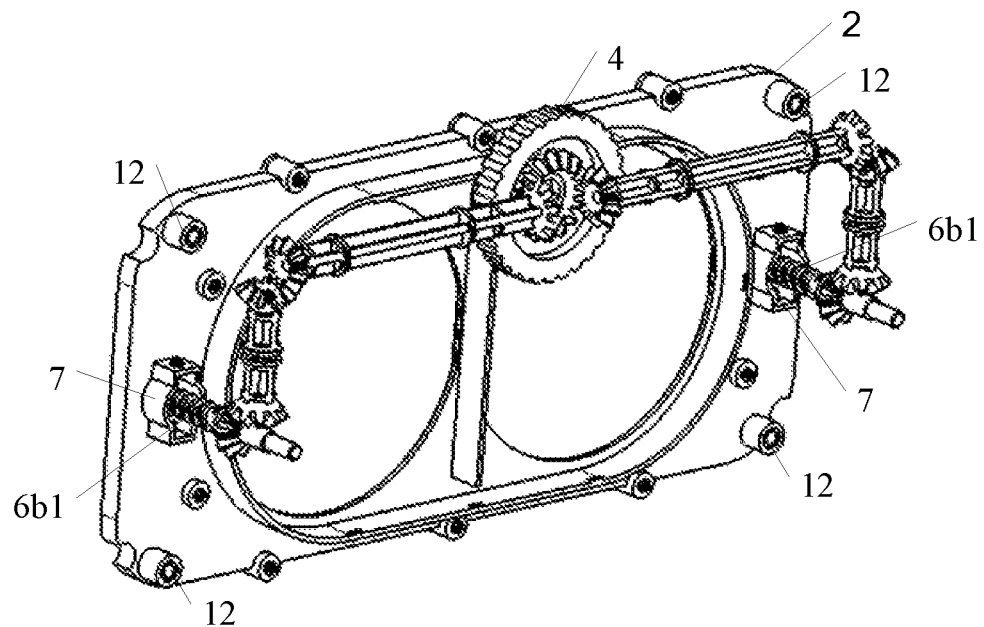
FIG. 3 is a front view of a state of connection between a display module frame and a drive adjustment mechanism of a head-mounted display provided by an embodiment of the present invention.
Figure 4:
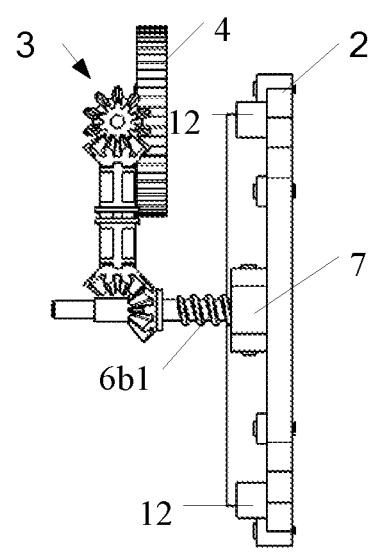
FIG. 4 is a side view of a state of connection between a display module frame and a drive adjustment mechanism of a head-mounted display provided by an embodiment of the present invention.

FIG. 1 is a front view of a body frame of a head-mounted display provided by an embodiment of the present invention; FIG. 2 is a schematic diagram of a drive adjustment mechanism of a head-mounted display provided by an embodiment of the present invention; FIG. 3 is a front view of a state of connection between a display module frame and a drive adjustment mechanism of a head-mounted display provided by an embodiment of the present invention; FIG. 4 is a side view of a state of connection between a display module frame and a drive adjustment mechanism of a head-mounted display provided by an embodiment of the present invention.

As shown in FIGS. 1 to 4, the head-mounted display comprises a body frame 1 configured to support an optical module of the head-mounted display, and a display module frame 2 configured to support a display module of the head-mounted display, the display module frame 2 being located at a front end of the body frame 1.

The head-mounted display further comprises a drive adjustment mechanism 3 including a control knob 4, a transmission component and a rotatable drive shaft 6;

the control knob 4 is mounted on the body frame 1;

the transmission component comprises a transverse transmission part 5a mounted on a horizontal border of the body frame 1 and a vertical transmission part 5b mounted on a vertical border of the body frame 1, one end of the transverse transmission part 5a is meshed with one end of the vertical transmission part 5b, and the control knob 4 is connected to a middle portion of the transverse transmission part 5a;

the drive shaft 6 has one end fixed on the body frame 1, the other end as a screw rod 6b1, and a middle portion meshed with the other end of the vertical transmission part 5b; the display module frame 2 is provided with a nut 7 fitted with the screw rod 6b1 of the drive shaft 6, and the screw rod 6b1 passes through the display module frame 2 via the nut 7;

when the control knob 4 rotates, it causes the drive shaft 6 to rotate through the transmission component, so that the display module frame 2 is movable forward and rearward relative to the body frame 1, thereby realizing the diopter adjustment of the head-mounted display.

Just through the transmission component and the drive shaft, the head-mounted display of this embodiment transforms the rotational motion of the control knob into the forward and rearward linear motion of display module frame. In this embodiment, the drive adjustment mechanism that adjusts the forward and rearward movement of the display module frame has the characteristics of simple structure, easy implementation, low cost and small occupied space, without influencing the appearance of the head-mounted display.

As shown in FIG. 2, the drive shaft 6 comprises a fixing portion 6a and a rotation portion 6b; the fixing portion 6a is fixedly mounted on the body frame 1; one end of the rotation portion 6b facing the display module frame 2 is a screw rod 6b1, the other end of the rotation portion 6b is sleeve-connected to the fixing portion 6a, and a bevel gear linked with the screw rod 6b 1 is provided at a position where the rotation portion 6b is sleeve-connected to the fixing portion 6a.

The control knob 4 has a bevel gear; the transverse transmission part 5a comprises a left-side transverse transmission part 5a1 and a right-side transverse transmission part 5a2 symmetrically provided on the horizontal border at two sides of the control knob 4; the vertical transmission part 5b comprises a left-side vertical transmission part 5b1 and a right-side vertical transmission part 5b2 symmetrically provided on the vertical borders at two sides.

In which, the transverse transmission part both at the left-side and right-side has two ends mounted with a bevel gear, and the vertical transmission part both at the left-side and right-side side also has two ends mounted with a bevel gear. Referring to FIG. 2, each of the left-side transverse transmission part 5a1, the right-side transverse transmission part 5a2, the left-side vertical transmission part 5b1, and the right-side vertical transmission part 5b2 has two ends mounted with a bevel gear.

The bevel gear of the control knob 4 is meshed with the bevel gear at one end of the transverse transmission part at each side, the bevel gear at the other end of the transverse transmission part at each side is correspondingly meshed with the bevel gear at one end of the vertical transmission part at the same side, and the bevel gear at the other end of the vertical transmission part at that side is correspondingly meshed with the bevel gear of the transmission shaft on the vertical border at the same side of the body frame 1. Referring to FIG. 2, the bevel gear at one end of the left-side transverse transmission part 5a1 is meshed with the bevel gear of the control knob 4 to realize a first 90° steering transmission; the bevel gear at the other end of the left-side transverse transmission part 5a1 is meshed with the bevel gear at one end of the left-side vertical transmission part 5b1 to realize a second 90° steering transmission; and the bevel gear at the other end of the left-side vertical transmission part 5b 1 is meshed with the bevel gear of the drive shaft 6 on the left-side vertical border to realize a third 90° steering transmission. Similarly, the bevel gear at one end of the right-side transverse transmission part 5a2 is meshed with the bevel gear of the control knob 4 to realize a first 90° steering transmission; the bevel gear at the other end of the right-side transverse transmission part 5a2 is meshed with the bevel gear at one end of the right-side vertical transmission part 5b2 to realize a second 90° steering transmission; and the bevel gear at the other end of the right-side vertical transmission part 5b2 is meshed with the bevel gear of the drive shaft 6 on the right-side vertical border to realize a third 90° steering transmission.

The drive adjustment mechanism in this embodiment can achieve a direction-variable transmission and transform a rotational motion into a linear motion, realize three steering transmissions through the cooperation among a set of bevel gears, and ensure the transmission to be stable and reliable.

As shown in FIG. 2, the transverse transmission part at each side of the drive adjustment mechanism 3 is provided with a first engagement portion 8a protruding from the surface thereof, a first support portion 9a is provided at a position on the horizontal border of the body frame 1 corresponding to the first engagement portion 8a of the transverse transmission part at each side, and the transverse transmission part at each side is mounted on the body frame 1 through the cooperation between the first engagement portion 8a and the first support portion 9a;

Correspondingly, the vertical transmission part at each side of the drive adjustment mechanism 3 is provided with a second engagement portion 8b protruding from the surface thereof, a second support portion 9b is provided at a position on the vertical border of the body frame 1 corresponding to the second engagement portion 8b of the vertical transmission part at each side, and the vertical transmission part at each side is mounted on the body frame 1 through the cooperation between the second engagement portion 8b and the second support portion 9b.

As shown in FIG. 1, the surface of the body frame 1 in this embodiment is further provided with a mounting slot 8 in which a part of the control knob 4 is accommodated, and the control knob 4 is fixedly mounted on the body frame 1 through a mounting shaft 8a in the mounting slot 8.

As shown in FIG. 2, the fixing portion 6a of the drive shaft 6 is fixed on the vertical borders at two sides of the body frame 1; a part of the control knob 4 is mounted in the mounting slot 8 through the mounting shaft 8a, and the other part is exposed outside the body frame 1 so that the control knob 4 can be conveniently turned by hand; wherein, preferably the fixing portion 6a of the drive shaft 6 is fixed at the middle portion of the vertical border, so as to ensure that the display module frame 2 is stably moveable forward and rearward relative to the body frame 1 under the driving of the drive adjustment mechanism 3.

Next, the transverse transmission part 5a is engaged with the first support portion 9a on the body frame 1 through the first engagement portion 8a of the transverse transmission part 5a, thus the transverse transmission part 5a is mounted on the horizontal border of the body frame 1. Correspondingly, the vertical transmission part 8b is engaged with the second support portion 9b on the body frame 1 through the second engagement portion 8b of the vertical transmission part 5b, thus the vertical transmission part 5b is mounted on the vertical border of the body frame 1.

It should be noted, in this embodiment the first engagement portion on the transverse transmission part can cooperate with the first support portion on the body frame to mount the transverse transmission part on the body frame, without influencing the transmission motion of the transmission part itself. Similarly, the second engagement portion on the vertical transmission part can cooperate with the second support portion on the body frame to mount the vertical transmission part on the body frame, without influencing the transmission motion of the transmission part itself.

In this embodiment, in order to ensure that the transverse transmission part and the vertical transmission part are stably and fixedly mounted on the body frame, the first engagement portions 8a are symmetrically provided at two sides of a middle position of the transverse transmission part at each side in a preset threshold distance to the middle position, and corresponding first support portions 9a are provided on the horizontal border of the body frame 1, so that the transverse transmission part at each side is stably and fixedly mounted, and the first engagement portions 8a can be provided at expected positions by adjusting the threshold distance. As shown in FIG. 2, at positions on the transverse transmission part at each side close to the bevel gears at two ends, the first engagement portions 8a symmetrical with respect to a center point of the transverse transmission part are provided, so that the transverse transmission part is stably and fixedly mounted on the horizontal border of the body frame.

The second engagement portions 8b are symmetrically provided at two sides of a middle position of the vertical transmission part at each side in a preset threshold distance to the middle position, and corresponding second support portions 9b are provided on the vertical borders at two sides of the body frame 1, so that the vertical transmission part at each side is stably and fixedly mounted, and the second engagement portions 8b can be provided at expected positions by adjusting the threshold distance. As shown in FIG. 2, at positions in a preset threshold distance to the center point of the vertical transmission part at each side the second engagement portions 8b symmetrical with respect to a center point of the vertical transmission part are provided, so that the vertical transmission part is stably and fixedly mounted on the vertical border of the body frame.

In a preferred solution of this embodiment, an auxiliary support is further provided on the body frame to limit a range of the forward and rearward movement of the display module frame.

Figure 5:
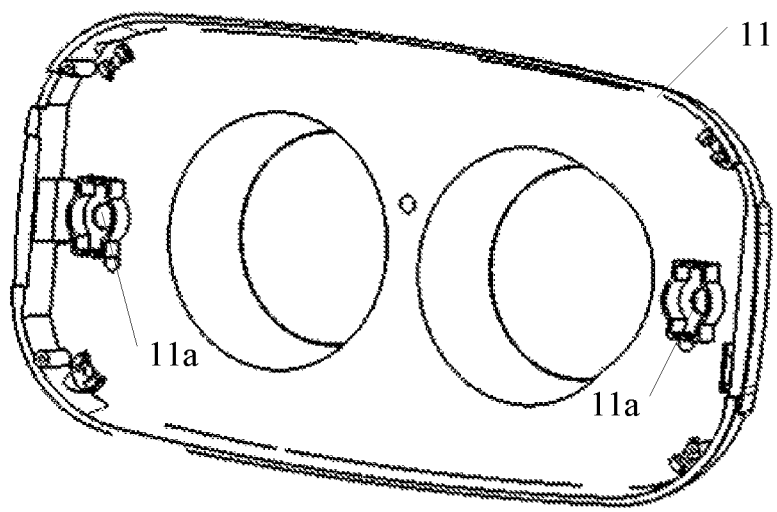
FIG. 5 is a schematic diagram of an auxiliary support of a head-mounted display provided by an embodiment of the present invention.
Figure 6:
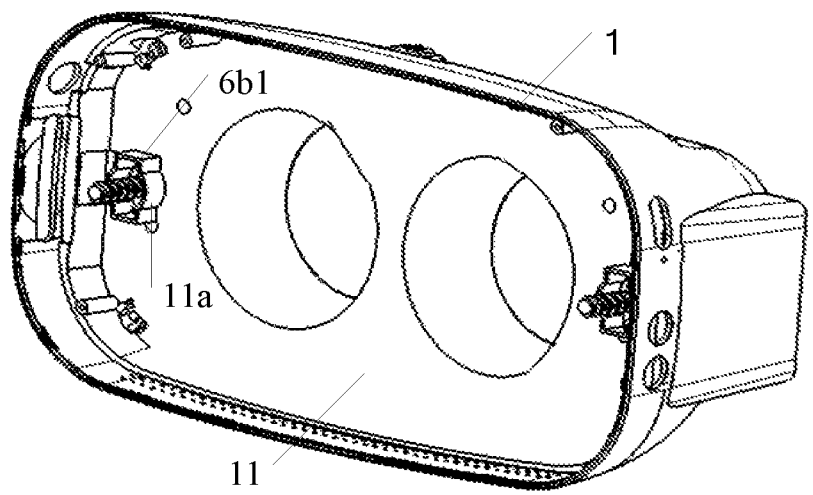
FIG. 6 is a schematic diagram of a body frame mounted with an auxiliary support provided by an embodiment of the present invention.

FIG. 5 is a schematic diagram of an auxiliary support of a head-mounted display provided by an embodiment of the present invention, and FIG. 6 is a schematic diagram of a body frame mounted with an auxiliary support provided by an embodiment of the present invention.

As shown in FIGS. 5 and 6, the body frame 1 is further provided with an auxiliary support 11 parallel with the display module frame 2, a mounting hole 11a is provided at a position on the auxiliary support 11 corresponding to the screw rod 6b 1 of the drive shaft 6 on the body frame 1, and the screw rod 6b1 of the drive shaft 6 is fitted with the nut 7 of the display module frame 2 after passing through the mounting hole 11a of the auxiliary support 11.

During the forward and rearward movement of the display module frame 2 caused by the transmission component, the identical-direction rotation of the control knob 4 is locked when the display module frame 2 contacts the auxiliary support 11. It can be understood that during the gradually rightward rotation of the control knob, the transmission component controls the screw rod of the drive shaft to rotate, so that the display module frame moves rearward, i.e., gradually approaches the body frame, and when the display module frame contacts the auxiliary support, the rightward rotation of the control knob cannot be continued any more.

In another preferred solution of this embodiment, the display module frame is further provided with a limiting hole, so as to limit a range of forward movement of the display module frame through the fitting between the limiting hole and a limiting post.

Figure 7:
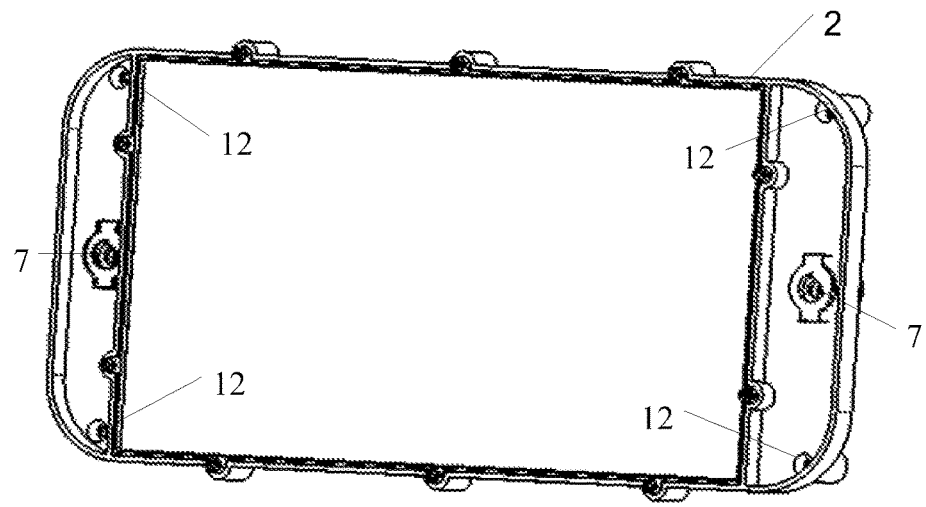
FIG. 7 is a schematic diagram of a display module frame of a head-mounted display provided by an embodiment of the present invention.
Figure 8:
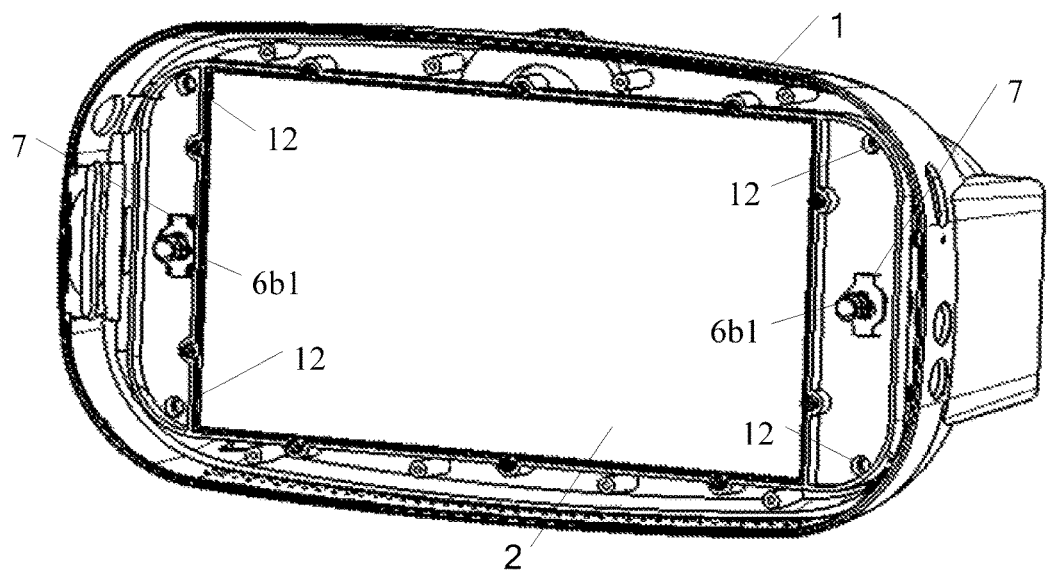
FIG. 8 is a schematic diagram of a body frame mounted with a display module frame provided by an embodiment of the present invention.

FIG. 7 is a schematic diagram of a display module frame of a head-mounted display provided by an embodiment of the present invention, and FIG. 8 is a schematic diagram of a body frame mounted with a display module frame provided by an embodiment of the present invention.

As shown in FIGS. 7 and 8, the display module frame 2 is provided with a limiting hole 12; a limiting post fitted with the limiting hole 12 has one end fixed to an auxiliary support 11 after passing through the limiting hole 12, the other end as the head of the limiting post, and a middle portion slidable relative to the limiting hole 12.

During the forward and rearward movement of the display module frame 2 caused by the transmission component, the identical-direction rotation of the control knob is locked when the head of the limiting post is engaged with the limiting hole 12. It can be understood that during the gradually leftward rotation of the control knob, the transmission component controls the screw rod of the drive shaft to rotate, so that the display module frame moves forward, i.e., gradually departs from the body frame, and when the head of the limiting post is engaged with the limiting hole, the leftward rotation of the control knob cannot be continued any more.

In actual applications, as shown in FIG. 7, limiting holes 12 are provided at four corners of the display module frame 2, respectively, and each limiting hole is fitted with one of the limiting posts, so that the display module frame 2 is stably slidable forward and rearward relative to the body frame 1.

In this embodiment, when the display module frame gradually moves toward the side of the body frame under the control of the drive adjustment mechanism, a myopic adjustment can be realized; and when the display module frame gradually moves away from the side of the body frame under the control of the drive adjustment mechanism, a hyperopic adjustment or a normal eyesight adjustment can be realized. For example, when the head-mounted display in this embodiment limits the rearward movement distance of the display module frame through the auxiliary support in the preferred solution and the display module frame moves to the furthest position at the rear side, a 800° myopic adjustment can be realized; and when the head-mounted display in this embodiment limits the forward movement distance of the display module frame through a fitted structure of the limiting hole and the limiting post in the preferred solution, and the display module frame moves to the furthest position at the front side, a 100° hyperopic adjustment or a normal eyesight adjustment can be realized.

In correspondence to the above head-mounted display, the embodiments of the present invention further provide a diopter adjustment method of a head-mounted display that comprises a body frame configured to support an optical module of the head-mounted display, and a display module frame configured to support a display module of the head-mounted display, the display module frame being located at a front end of the body frame; the method diopter adjustment method of the head-mounted display specifically comprises:

mounting a control knob, a left-side transverse transmission part and a right-side transverse transmission part which have bevel gears on a horizontal border of the body frame;

mounting a drive shaft, a left-side vertical transmission part or a right-side vertical transmission part on vertical borders at two sides of the body frame, respectively; wherein the drive shaft comprises a fixing portion and a rotation portion; the fixing portion is fixedly mounted on the body frame; one end of the rotation portion facing the display module frame is a screw rod, the other end of the rotation portion is sleeve-connected to the fixing portion, and a bevel gear linked with the screw rod is provided at a position where the rotation portion is sleeve-connected to the fixing portion;

respectively mounting a bevel gear at each end of the left-side transverse transmission part and each end of the right-side transverse transmission part, and respectively mounting a bevel gear at each end of a left-side vertical transmission part and each end of a right-side vertical transmission part, so that the bevel gear of the control knob is respectively meshed with to bevel gear at one end of the transverse transmission part at each side, a bevel gear at the other end of the transverse transmission part at each side is correspondingly meshed with a bevel gear at one end of the vertical transmission part at the same side, and a bevel gear at the other end of the vertical transmission part at that side is correspondingly meshed with a bevel gear of a transmission shaft on the vertical border at the same side of the body frame;

providing a nut fitted with the screw rod of the drive shaft on the display module frame, the screw rod passing through the display module frame via the nut;

turning the control knob to cause the drive shafts on the vertical borders at two sides of the body frame to rotate simultaneously through the transverse transmission parts and the vertical transmission parts at two sides, so that the display module frame is movable forward and rearward relative to the body frame, thereby realizing a diopter adjustment of the head-mounted display.

It should be noted that the diopter adjustment method of the head-mounted display in the present invention corresponds to the aforementioned head-mounted display, thus an implementation process of the diopter adjustment method of the head-mounted display please refer to the detailed descriptions of the aforementioned head-mounted display, which are omitted herein.

In conclusion, the present invention discloses a head-mounted display and a diopter adjustment method thereof, wherein a rotatable drive shaft is provided on the body frame of the head-mounted display, the body frame is connected to a display module frame of the head-mounted display through the drive shaft, a transmission component is provided on the body frame and driven with the control knob to cause the drive shaft to rotate, so as to transform a rotational motion of the control knob into a forward and rearward linear motion of the display module frame, so that the display module frame is movable forward and rearward relative to the body frame, thereby realizing a diopter adjustment of the head-mounted display. The present invention has the characteristics of simple structure, easy implementation, and low cost.

The above descriptions are just preferred embodiments of the present invention, rather than limitations to the protection scope thereof. Any amendment, equivalent replacement, improvement, etc. made within the spirit and principle of the present invention shall fall within the protection scope of the present invention.

What is claimed is:

1. A head-mounted display, comprising:
a body frame configured to support an optical module of the head-mounted display, and a display module frame configured to support a display module of the head-mounted display, the display module frame being located at a front end of the body frame, wherein the head-mounted display comprises a control knob, a transmission component and a rotatable drive shaft,
the control knob is mounted on the body frame;
the transmission component comprises a transverse transmission part mounted on a horizontal border of the body frame and a vertical transmission part mounted on a vertical border of the body frame; one end of the transverse transmission part is meshed with one end of the vertical transmission part, and the control knob is connected to a middle portion of the transverse transmission part;
the drive shaft has one end fixed on the body frame, the other end as a screw rod, and a middle portion meshed with the other end of the vertical transmission part; the display module frame is provided with a nut fitted with the screw rod of the drive shaft, and the screw rod passes through the display module frame via the nut;
when the control knob rotates, it causes the drive shaft to rotate through the transmission component, so that the display module frame is movable forward and rearward relative to the body frame, thereby realizing a diopter adjustment of the head-mounted display.

2. The head-mounted display according to claim 1, wherein the drive shaft comprises a fixing portion and a rotation portion;
the fixing portion is fixedly mounted on the body frame;
one end of the rotation portion facing the display module frame is a screw rod, the other end of the rotation portion is sleeve-connected to the fixing portion, and a bevel gear linked with the screw rod is provided at a position where the rotation portion is sleeve-connected to the fixing portion.

3. The head-mounted display according to claim 2, wherein the control knob has a bevel gear; the transverse transmission part comprises a left-side transverse transmission part and a right-side transverse transmission part symmetrically provided on horizontal border at two sides of the control knob; and the vertical transmission part comprises a left-side vertical transmission part and a right-side vertical transmission part symmetrically provided on vertical borders at two sides;
the transverse transmission part at each side has two ends mounted with a bevel gear, and the vertical transmission part at each side also has two ends mounted with a bevel gear;
the bevel gear of the control knob is respectively meshed with a bevel gear at one end of the transverse transmission part at each side, a bevel gear at the other end of the transverse transmission part at each side is correspondingly meshed with a bevel gear at one end of the vertical transmission part at the same side, and a bevel gear at the other end of the vertical transmission part at that side is correspondingly meshed with a bevel gear of a transmission shaft on the vertical border at the same side of the body frame.

4. The head-mounted display according to claim 1, wherein the body frame is further provided with an auxiliary support parallel with the display module frame, a mounting hole is provided at a position on the auxiliary support corresponding to the screw rod of the drive shaft on the body frame, and the screw rod of the drive shaft is fitted with the nut of the display module frame after passing through the mounting hole of the auxiliary support;
during a forward and rearward movement of the display module frame caused by the transmission component, the identical-direction rotation of the control knob is locked when the display module frame contacts the auxiliary support.

5. The head-mounted display according to claim 4, wherein the display module frame is provided with a limiting hole; a limiting post fitted with the limiting hole has one end fixed to the auxiliary support after passing through the limiting hole, the other end as a head of the limiting post, and a middle portion slidable relative to the limiting hole;
during a forward and rearward movement of the display module frame caused by the transmission component, the identical-direction rotation of the control knob is locked when the head of the limiting post is engaged with the limiting hole.

6. The head-mounted display according to claim 5, wherein the limiting holes are provided at four corners of the display module frame, respectively, and each limiting hole is fitted with one of the limiting posts, so that the display module frame is stably slidable forward and rearward relative to the body frame.

7. The head-mounted display according to claim 3, wherein the transverse transmission part at each side is provided with a first engagement portion protruding from a surface thereof, a first support portion is provided at a position on the horizontal border of the body frame corresponding to the first engagement portion of the transverse transmission part at each side, and the transverse transmission part at each side is mounted on the body frame through the cooperation between the first engagement portion and the first support portion;
the vertical transmission part at each side is provided with a second engagement portion protruding from a surface thereof, a second support portion is provided at a position on the vertical border of the body frame corresponding to the second engagement portion of the vertical transmission part at each side, and the vertical transmission part at each side is mounted on the body frame through the cooperation between the second engagement portion and the second support portion.

8. The head-mounted display according to claim 7, wherein the first engagement portions are symmetrically provided at two sides of a middle position of the transverse transmission part at each side in a preset threshold distance to the middle position, and corresponding first support portions are provided on the horizontal border of the body frame, so that the transverse transmission part at each side is stably and fixedly mounted;
the second engagement portions are symmetrically provided at two sides of a middle position of the vertical transmission part at each side in a preset threshold distance to the middle position, and corresponding second support portions are provided on the vertical borders at two sides of the body frame, so that the vertical transmission part at each side is stably and fixedly mounted.

9. The head-mounted display according to claim 1, wherein a surface of the body frame is further provided with a mounting slot in which a part of the control knob is accommodated and fixedly mounted on the body frame through a mounting shaft in the mounting slot.

10. A diopter adjustment method of a head-mounted display that comprises a body frame configured to support an optical module of the head-mounted display, and a display module frame configured to support a display module of the head-mounted display, the display module frame being located at a front end of the body frame, wherein the method comprises:

mounting a control knob, a left-side transverse transmission part and a right-side transverse transmission part which have bevel gears on a horizontal border of the body frame;

mounting a drive shaft, a left-side vertical transmission part or a right-side vertical transmission part on vertical borders at two sides of the body frame, respectively; wherein the drive shaft comprises a fixing portion and a rotation portion; the fixing portion is fixedly mounted on the body frame; one end of the rotation portion facing the display module frame is a screw rod, the other end of the rotation portion is sleeve-connected to the fixing portion, and a bevel gear linked with the screw rod is provided at a position where the rotation portion is sleeve-connected to the fixing portion;

mounting a bevel gear at each end of the left-side transverse transmission part and each end of the right-side transverse transmission part, respectively, and mounting a bevel gear at each end of a left-side vertical transmission part and each end of a right-side vertical transmission part, respectively, so that the bevel gear of the control knob is respectively meshed with a bevel gear at one end of the transverse transmission part at each side, a bevel gear at the other end of the transverse transmission part at each side is correspondingly meshed with a bevel gear at one end of the vertical transmission part at the same side, and a bevel gear at the other end of the vertical transmission part at that side is correspondingly meshed with a bevel gear of a transmission shaft on the vertical border at the same side of the body frame;

providing a nut fitted with the screw rod of the drive shaft on the display module frame, the screw rod passing through the display module frame via the nut;

turning the control knob to cause the drive shafts on the vertical borders at two sides of the body frame to rotate simultaneously through the transverse transmission parts and the vertical transmission parts at two sides, so that the display module frame is movable forward and rearward relative to the body frame, thereby realizing a diopter adjustment of the head-mounted display.

* * * * *